June 12, 1956 T. STREM 2,749,799

PHOTOGRAPHIC EXPOSURE TIMING DEVICE

Filed Aug. 13, 1953 5 Sheets-Sheet 1

INVENTOR
Thomas Strem.

BY

Hyman Diamond

ATTORNEY

June 12, 1956 T. STREM 2,749,799

PHOTOGRAPHIC EXPOSURE TIMING DEVICE

Filed Aug. 13, 1953 5 Sheets-Sheet 2

*INVENTOR.*
Thomas Strem.
*BY*
Hymen Diamond
ATTORNEY

June 12, 1956 T. STREM 2,749,799

PHOTOGRAPHIC EXPOSURE TIMING DEVICE

Filed Aug. 13, 1953 5 Sheets-Sheet 3

INVENTOR.
Thomas Strem.
BY
Hyman Diamond
ATTORNEY

PHOTOGRAPHIC EXPOSURE TIMING DEVICE

Filed Aug. 13, 1953 5 Sheets-Sheet 4

INVENTOR.
Thomas Strem.
BY
Hyman Diamond
ATTORNEY

INVENTOR.
Thomas Strem.
BY
Hyman Diamond
ATTORNEY

United States Patent Office 2,749,799

Patented June 12, 1956

2,749,799

PHOTOGRAPHIC EXPOSURE TIMING DEVICE

Thomas Strem, Pittsburgh, Pa.

Application August 13, 1953, Serial No. 373,994

4 Claims. (Cl. 88—24)

My invention relates to photographic apparatus and has particular relation to apparatus used in the printing or enlarging of photographs.

In printing or enlarging a sensitive photographic medium such as a sensitive paper is exposed to an image of the negative to be enlarged. Light from a suitable source is projected on the negative and the impression on the negative so illuminated is imaged on the medium by means of a suitable lens system. After the medium has been adequately exposed the medium is subjected to a developing process. A number of different types of media or printing papers have been developed and one or the other of these is selected in accordance with the requirements confronting the printing plant.

One of the principal industrial problems which confronts a modern printing or enlarging plant is the large number of prints which are to be processed. Thus in a typical plant for a commercial photographic studio as many as ten thousand prints per day may be processed. The number of prints which are processed in a plant which handles the printing for amateurs is still higher and may be as high as 50,000 to 75,000 per day. It is then necessarily desirable that facilities for producing prints or enlargements automatically at a high rate be provided. This desideratum is particularly pressing in the United States where labor costs are very high.

The principal difficulty which confronts an automatic plant arises from the fact that all negatives from which prints and enlargements are to be made are not of the same density and are not even of densities which lie within a reasonable range. The densities of the negatives, submitted by amateurs, vary over a wide range from negatives which are substantially transparent to those which are substantially opaque. While the range of variation of commercial negatives is not so wide, commercial negatives also vary widely. In addition, the range of variations of the density in different parts of a negative may be wide. Where the shadows and the highlights contrast strongly, the shadows may be substantially transparent and the highlights opaque.

Wide density variation among different negatives is taken care of in a non-automatic or semi-automatic printing process by adjustment of the timing during or before the exposure of each of the negatives and by further adjustment of the development baths and of the timing during development. Different sensitive media may also be selected in accordance with the densities of the different negatives in a non-automatic or semi-automatic process. Wide density variation in a single negative is adjusted by a process of so-called dodging or printing in. In dodging the printing medium is first exposed to the light transmitted through the negative as a whole. Shortly thereafter, the more transparent parts of the negative are covered and the exposure of the less transparent parts of the negative continues. Naturally the dodging process must be carried out by hand and is very time consuming. These different expedients depend on the judgment and skill of the operator of the apparatus and are subject to human failures.

A satisfactory automatic printing process should handle all negatives as they are transmitted through the apparatus. There are no facilities in such a process for separating the negatives into groups, for handling certain negatives specially or for dodging.

Since the problem of producing prints for enlargements from large numbers of negatives has confronted the photographic industry for many years, it is to be realized that many proposed solutions for the problem have been presented. Typical solutions are disclosed in the following patents: Tuttle, et al., 1,933,831; Tuttle, 1,954,338; Denis, 1,973,469; Merriman, et al., 2,258,994; Burnham, et al., 2,353,318; Troup, 2,605,447; Rabinowitz, 2,607,266.

In accordance with my experience, the automatic printing apparatus disclosed in the above listed patents and others of like character have not proved satisfactory.

It is, accordingly, an object of my invention to provide automatic printing apparatus with which it shall be possible to produce satisfactory prints or enlargements from negatives of the varying densities encountered in practice.

It is another object of my invention to provide automatic printing or enlarging apparatus in the use of which satisfactory prints shall be produced from negatives having strongly contrasting highlights and shadows without dodging.

A further object of my invention is to provide automatic printing or enlarging apparatus with which it shall be possible to produce satisfactory prints at a high rate from negatives which vary in density over a wide range.

Still another object of my invention is to provide automatic printing apparatus in the use of which failure from human misjudgment or lack of skill shall be minimized.

Still a further object of my invention is to provide automatic printing apparatus in the use of which so-called reciprocity produced by the scattering of light in the reproducing medium and the consequent greying or fogging of the print shall be suppressed.

A still further object of my invention is to provide a novel control circuit for automatic printing or enlarging apparatus.

In prior art automatic or semi-automatic apparatus the light from a source is projected through a negative to the reproducing medium such as the printing paper and also to a photoelectric device connected in a timing circuit. The photoelectric device causes the timing circuit to time the exposure of the reproducing medium in accordance with the intensity of the light transmitted to it. My invention arises from the realization, as the result of an elaborate investigation of the printing enlarging process, that the actinic value of the light or the character of the radiation emitted by the source must be so correlated with the spectral response of the photoelectric device and the spectral response of the sensitive medium that the timing circuit times, not the overall exposure of the reproducing medium to light, but only the effective exposure of the medium to the light from the negative. While I do not desire to be bound by any theoretical explanation of my invention, the following explanation is here presented with the thought that it may help in understanding the invention.

In automatic printing and enlarging apparatus of the prior art type, it is customary to apply full power to the printing source which is usually a tungsten filament only during the exposure interval, while the shutter is open. This is a practical necessity since if the printing source were at full power during the composing of the negative the sensitive medium would be exposed. The source being a tungsten filament has substantial heat capacity and when power is applied to this filament, it comes up to full temperature in an appreciable time interval. Thus the data on page 11 of the General Electric Company Lamp Bulletin LD-1, October 1950, shows that a 500-watt tungsten lamp comes up to full temperature in a time interval of the order of .15 second; a 750-watt lamp in a time interval of the order of .17 second; and a 1000-watt lamp in a time interval of the order of .23 second. The intervals given in the tables on page 11 from which this data is taken are the time intervals required for the current of the lamp to drop to normal value from the initial high value. But the current is dependent on the resistance of the filament and the resistance is in turn dependent on the temperature of the filament. Thus the time interval required by the filament to reach its normal current value is the same as the time interval required by the lamp to reach its high temperature resistance value and therefore is the same as the time interval required by the lamp to reach the high temperature.

For very thin negatives the exposure interval is only of the order of one to three-tenths of a second in commercial work and may be as low as .01 second in amateur processing. Thus, a large proportion of the time consumed in exposing a very thin negative is consumed by the lamp in reaching its stable exposing temperature. Now, as the filament of the lamp rises in temperature its radiation changes. As the temperature increases the wavelength of the radiation decreases and the radiation gradually changes from a spectral distribution including only a very small component of blue to a distribution including a substantial component of blue. The impression on the sensitive medium is largely produced by the blue radiation. On the other hand, most photoelectric devices have substantial response in other parts of the spectrum than in the blue. Thus when a very thin negative is being printed, the reproducing medium is exposed to light which varies from non-actinic quality to the blue actinic quality over the time of exposure and is non-actinic over a large proportion of this time. While the reproducing medium is not being effectively exposed during this time, the photocell is effectively responding to the light and is timing out. Thus at the end of the time interval, the reproducing medium has not been effectively exposed and the time interval has terminated.

The delay involved in the heating of the filament is also of importance in the case of dense negatives but in this case another factor becomes important. That important principle of optics comes into effect that the scattering effect of small particles on radiation is inversely proportional to the fourth power of the wavelength and short wave radiation is scattered more effectively than long wave radiation. In the printing of a heavy negative, the time interval is relatively long and the filament from which the printing light is derived has reached its stable temperature before the timing interval is at an end. This light has a spectral distribution which includes substantial components of wavelengths over a wide range from the infra-red to the ultra-violet. The negative being relatively dense has a tendency to scatter this light and thus prevent it from impinging on the reproducing medium, but this tendency is more effective for the lower wavelength blue actinic radiation which effectively produces the impression on the medium than for the longer wavelength red radiation which does not affect the medium. On the other hand, the photocell responds with reasonable effectiveness to the longer wavelength radiation and times out before the exposure has been completed. It thus appears that for negatives at both extremes, that is, both thin negatives and dense negatives, the relationship between the response of the reproducing medium and the spectral distribution of the radiation and the response of the photoelectric cell and the spectral distribution of the radiation is such that the timing is to a large extent incorrect.

In accordance with my invention I provide automatic printing or enlarging apparatus in which the printing source for all negatives printed has a spectral distribution so related to the response of the reproducing medium and of the photoelectric device that the medium is effectively exposed to actinic radiation during substantially the whole timing interval timed by the photoelectric device and its associated timer. My approach is to a large extent pragmatic, but my invention in its specific aspects resides in the realization that the coordination of the source, medium and cell does yield the desired results. I have found that satisfactory prints may be produced automatically from negatives varying over a wide range with the printing lamp operated at a voltage such that its color rating is of the order of at least 3200° to 3400° K. Such desired radiation is produced for example with a General Electric 150-watt, 115-volt inside frosted lamp operating at a voltage of 165 volts. I have produced a large number of prints from negatives varying over a wide range with this lamp operated at 165 volts and the prints produced have been entirely satisfactory. Similar satisfactory prints are produced by operating lamps of other types of a wide variety at suitable minimum voltages. I have further found that when the lamps are operated as just described at voltages to produce the desired Kelvin rating, the time intervals during which the medium must be exposed is relatively short and thus the automatic apparatus is capable of producing a large number of prints per unit time.

I have also found that satisfactory prints or enlargements may be produced from negatives varying in density over a wide range with the filament operated at a lower voltage and with the light from the filament selectively filtered. Thus I have found that with the General Electric 500-watt PH-B-2 lamp operated at from 90 through 120 volts and with the General Electric 1000-watt PH-B-4 operated at from 80 through 115 volts, satisfactory prints are produced. Both of these lamps are of the daylight type and have blue envelopes. With this filtered light, the time taken in producing prints is longer than with unfiltered light. Thus the time of producing prints with the automatic apparatus is increased and fewer prints are produced per unit time when the filters are used. On the other hand, the filters make possible the operation of the lamp at a substantially lower voltage than without the filters and thus the life of the source is increased. In addition, the enlargements or prints produced with the filter are of higher quality and more uniform for a wide range of negative density than without the filters. It thus appears that in accordance with my invention satisfactory prints may be produced at a high rate from a wide range of negatives with a source operated at at least a minimum voltage, or at a lower rate with a source operated at a lower voltage and a filter interposed between the filament and the other apparatus. The aspect of my invention as just distinguished which is practiced in any situation must depend on the particular plant in which the printing is being carried out. Thus in a plant which prints for amateurs the high voltage source may be used because it is desirable that the prints be produced at a very high rate in response to public demand and the quality of the prints need not be of the highest. On the other hand, in a plant for a commercial photographic studio where speed of reproduction is not the most important element and quality is highly important, the filter system, in accordance with my invention, may be used.

In accordance with a further aspect of my invention, I have further improved the quality of prints obtained from a wide range of negatives by eliminating the heating time for the source. In the practice of my invention the source is maintained at full voltage continuously or is energized a time interval before the shutter is operated which is of sufficient length for the lamp to reach its full emissivity.

The novel features that I consider characteristic of my invention are set forth generally above. The invention itself, however, both as to its organization and its method of opeartion, together with additional objects and advantages thereof, will best be understood from the following description of a specific embodiment when read in connection with the accompanying drawings, in which.

Figures 12, 13:
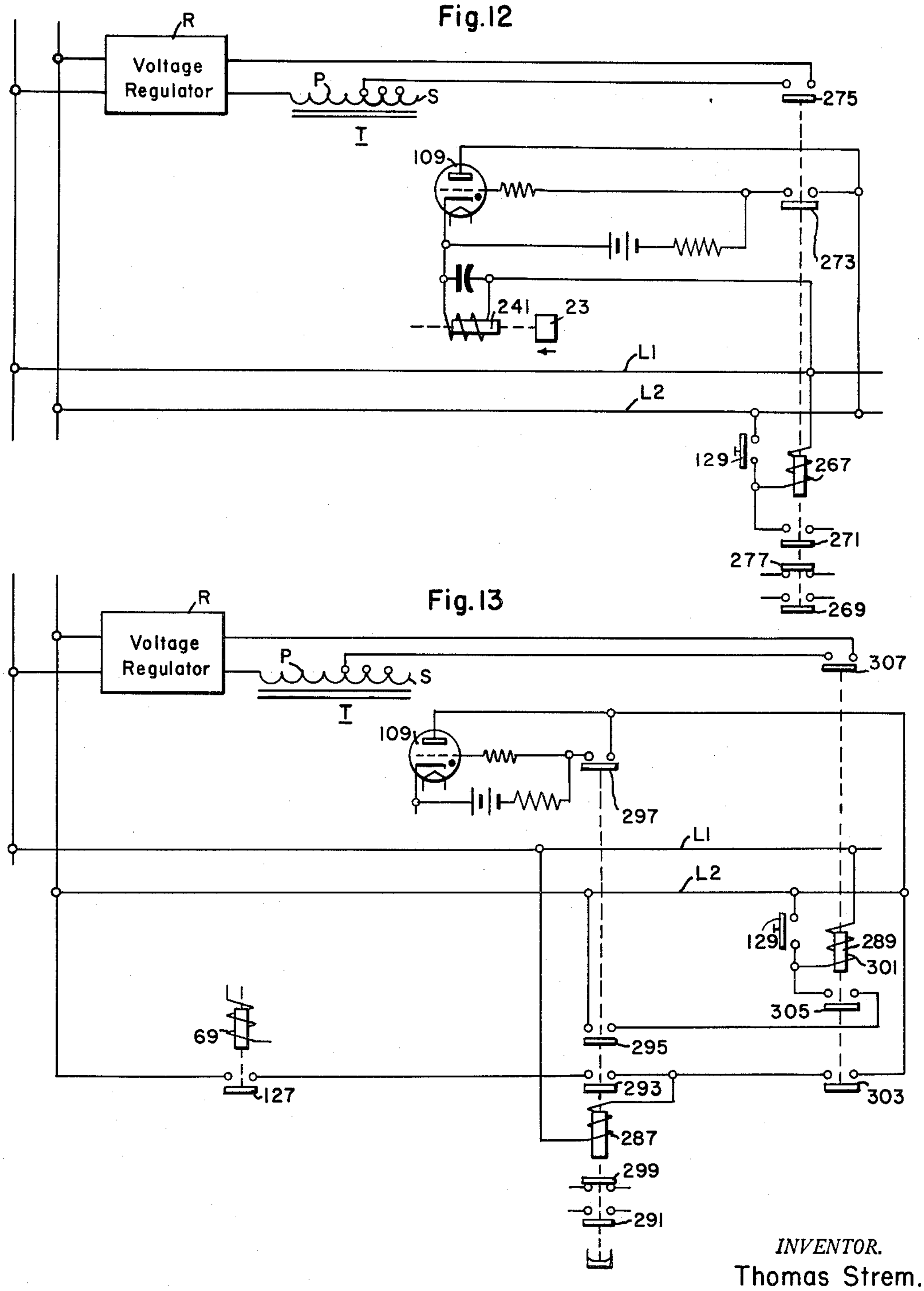

Figs. 11*a, b, c,* are three graphs showing the response reproducing media, that is printing paper of different types used in the practice of my invention;

Fig. 12 is a portion of a circuit diagram showing a modification of my invention; and Fig. 13 is a portion of a circuit diagram showing another modification of my invention.

Figure 1A:
Figures 1A, 1B, 1C and 1D are actual reproductions of negatives varying in density over a wide range typical of those which are printed in the practice of my invention.
Figure 1B:
Figure 1C:
Figure 1D:
Figure 2A:
Figs. 2A, 2B, 2C and 2D are a set of prints made from the negatives of Figs. 1A through 1D under conditions not in accordance with the specific aspects of my invention.
Figure 2B:
Figure 2C:
Figure 2D:

Figs. 1A through 4D show the negatives with which my apparatus works and compares the results produced practicing my invention in its specific aspects with results produced not practicing my invention. In these figures, Figs. 1A, 1B, 1C and 1D, respectively, are photographs of negatives which, as can be seen, differ in density over a wide range. The negative shown in Fig. 1A is very thin and transparent. The negative shown in Fig. 1D is very dense and substantially opaque. The problem with which the modern printing and enlarging industry is confronted is to produce sound prints from negatives varying over this range automatically and without dodging. In producing these prints automatically, it is, in addition, naturally not practicable to change the developing timing operation in any way. The reproducing medium, once it is exposed, must pass through the developing chain without any modification in this chain for individual exposure.

Figs. 2A through 4D are photographs of prints produced by such an automatic process. In each case the prints were made on one type of developing paper by repeated operation of apparatus in accordance with my invention without dodging. The prints were developed in a continuous development chain set for a typical normal negative. No special developing timing was applied to any of the prints. The letters A, B, C, D in the identification for the prints show the negatives from which the prints were made. A photograph identified by a letter shows a print made from the negative identified by the same letter. Figs. 2A, 2B, 2C, 2D are photographs of prints produced not practicing my invention in its specific aspects. As can be seen the prints shown in Figs. 2A through 2D are not satisfactory. In the prints shown in Fig. 2D made from negative 1D the subject is pale and details are lacking. The same comments apply to the other prints. They lack lights and shadows and on the whole are not acceptable either for amateur or for commercial service.

Figure 3A:
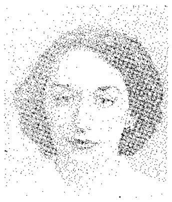
Figs. 3A, 3B, 3C and 3D are another set of prints made from the negatives of Figs. 1A through 1D under conditions in accordance with the specific aspects of my invention.
Figure 3B:
Figure 3C:
Figure 3D:
Figure 4A:
Figs. 4A, 4B, 4C and 4D are reproductions of prints made from the negatives under still other conditions in accordance with my invention.
Figure 4B:
Figure 4C:
Figure 4D:

The prints shown in Figs. 3A through 3D are more satisfactory. These prints are to a large extent substantially uniform and they do show lights and shadows. The print shown in Fig. 3D is not entirely satisfactory as it fails to bring out to the desired extent the details and the lights and shadows. It is probable that the prints shown in Figs. 3A through 3D would be acceptable in the amateur field but not in the commercial field.

The prints shown in Figs. 4A through 4D are entirely satisfactory. They bring out all of the detail that is present in the corresponding negatives. They are uniform, they show the lights and shadows and they would be acceptable both to amateur photographers and to the highly critical commercial photographers.

The apparatus with which the acceptable prints for amateur or commercial service are produced is shown in Figs. 5 through 11. I will now describe this apparatus.

DESCRIPTION OF APPARATUS

Figure 5:
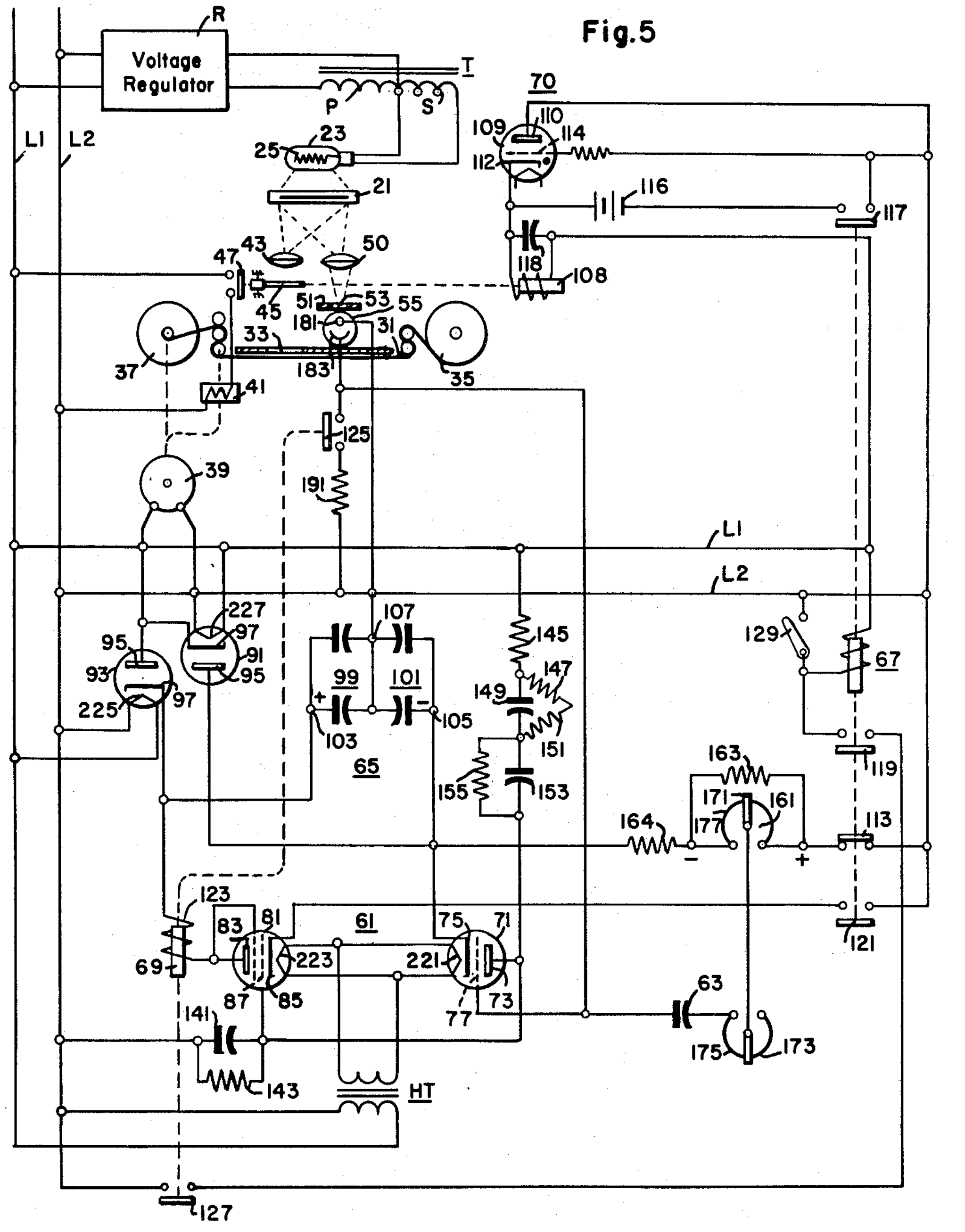
Fig. 5 is a circuit diagram of the circuit of a preferred embodiment of my invention.
Figure 6:
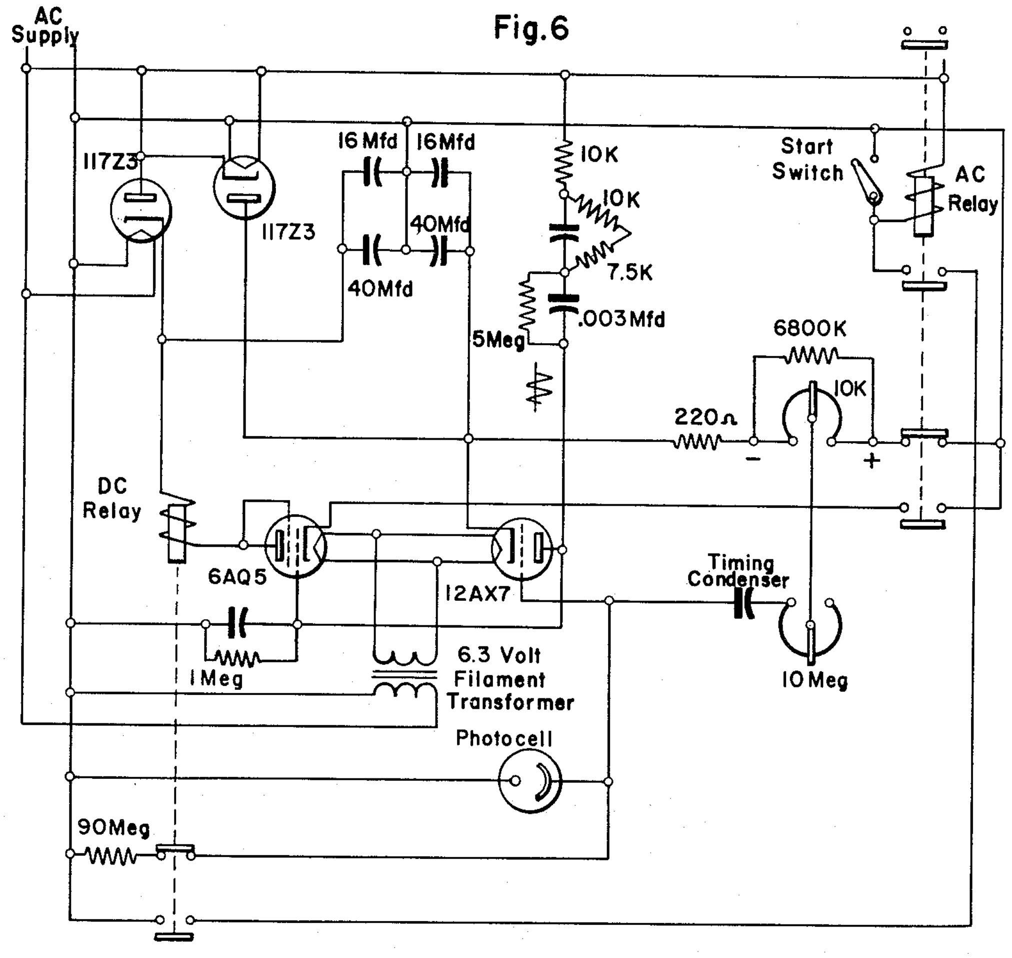
Fig. 6 is a circuit diagram showing all of the components and certain of the wave forms of the circuit shown in Fig. 5.

The apparatus shown in Fig. 5 includes a platen 21 for holding a negative to be enlarged or printed and a source of light 23 with which prints or enlargements of negatives are to be produced and which is disposed to project light on a negative in the platen. The radiation from the source 23 may be projected on the negative directly or through a condenser lens system (not shown). The source 23 is in accordance with the preferred practice of my invention a lamp having a filament 25 of tungsten or other suitable material. The filament 25 may be energized from the conductors L1 and L2 of a commercial supply through a regulator R and a transformer T which may be an auto-transformer. The regulator 27 serves to maintain the lamp voltage within the desired range and may be of any suitable type, electronic or magnetic or even a bank of ballast lamps or the like. The regulator R is shown as connected in the circuit of the primary P of the transformer T; it may also be connected in circuit with the secondary S. Under certain circumstances a current regulator rather than a voltage regulator may be used. In accordance with a specific aspect of my invention the source 23 is continuously supplied with power and is at full emissivity.

The resulting light transmitted through the negative when it is illuminated by the source 23, which light may in effect be regarded as emitted by the negative as a new source, is projected for a fixed time interval on a reproduring medium which is usually in the form of a sensitized paper 31. Where my invention is practiced to reproduce motion picture films, the medium 31 is a positive film. This paper is supplied to a gate 33, not shown in detail, where it is exposed, from a feed reel 35 and is after exposure wound on a take-up reel 37. The take-up reel is driven by a motor 39 through a clutch 41 not shown in detail which is actuable intermittently between exposures. During the exposure time the clutch 41 is disengaged from the motor and the paper 31 is at rest in the gate 33. An image of the negative is produced on the paper in the gate by means of a suitable lens system 43. In the quiescent condition of the apparatus, the light from the lens system 43 is prevented from impinging on the paper 31 by a shutter 45 which may be composed of a safety glass that does not transmit actinic light. The shutter 45 is moving from the position in which it exposes the paper 31 to the position in which it blocks the source actuates a normally open switch 47, preferably a microswitch, which closes a circuit through the clutch 41.

Figure 8:
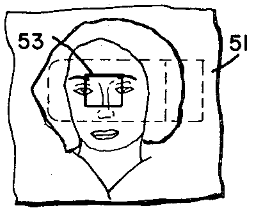
Fig. 8 is a view in top elevation of a photoelectric device and its screen as used in the practice of my invention.

The negative is also imaged by means of a lens system 50 on a screen 51 having an opening 53 therein disposed to transmit light to a photoelectric device 55 preferably of the emissive type. While the opening 53 may be sufficiently large to transmit the whole image of the negative and thus to produce a response in the photocell 55 which is dependent on the average light transmitted by the negative, in accordance with the preferred practice of my invention, the opening 53 in the screen 51 is not sufficiently large to transmit the whole image of the negative but only to transmit a selected portion of the picture which appears on the negative. This portion is selected from a section of the negative which is optically representative of the highlights and shadows of the negative. Thus where a portrait such as is shown in Figs. 1A through 4D is to be printed, the selected portion is usually a small rectangular portion including the lower portion of the forehead, the bridge and tip of the nose and the whites of the eyes on both sides of the nose. A screen 51 on which this portion of a portrait is imaged is shown in Fig. 8.

The apparatus disclosed in Fig. 5 also includes an amplifier 61 which is shown as having two stages, for the photoelectric device 55, a timing capacitor 63, a direct current supply 65 for the amplifier and a pair of relays 67 and 69 for controlling the operation of the system. The apparatus further includes an actuating circuit 70 for the shutter 45.

The amplifier includes an input tube 71 having an anode 73, a cathode 75, and a grid 77 and an output tube 81 having an anode 83, a cathode 85 and a grid 87. The direct current supply 65 is of the voltage doubler type and includes a pair of rectifiers 91 and 93 each having an anode 95 and a cathode 97 and two banks of capacitors 99 and 101. The cathode 97 of rectifier 91 is connected directly to conductor L1; the anode 95 is connected to conductor L2 through capacitor bank 101. The anode 97 of rectifier 93 is connected directly to conductor L1 and the cathode to conductor L2 through bank 99. The direct current supply thus has a positive terminal 103 at bank 99, a negative terminal 105 at bank 101 and an intermediate terminal 107, at conductor L2 between the banks. The shutter circuit 70 includes a solenoid 108 of the direct current type by means of which the shutter and a thyratron 109 are actuable. The thyratron has an anode 110, a cathode 112 and a grid 114. The solenoid 108 is connected to the conductors L1, L2 through the anode 110 and the cathode 112 of the thyratron. A bias 116 is connected between the cathode 112 and the grid 114 to bias the thyratron 109 to non-conductive. The thyratron 109 conducts only during alternate half periods of the supply L1, L2 and a capacitor 118 is connected across the solenoid 108 to prevent it from chattering.

One of the relays, 67, is an A. C. relay which starts the operation of the system and the other, 69, is a D. C. relay. The A. C. relay 67 includes a coil 111, a normally closed or back contact 113 and a plurality of normally open or front contacts 117, 119, 121. The D. C. relay 69 includes a coil 123, a normally closed contact 125 and a normally open contact 127. The coil 111 of the A. C. relay 67 is adapted to be connected across the conductor L1 and L2 through a pushbutton switch 129 which may be released once the coil 111 is actuated. A normally open contact 119 of the relay 67 is connected through the coil 111 and through a normally open contact 127 of the D. C. relay 69 to lock in the coil 111 once the D. C. relay is actuated to assure that once the operation is started it continues until an explosure has been completed. Another normally open contact 117 is connected to close the circuit between the anode 110 and the grid 114 of the thyratron 109 which controls the shutter 45. The remaining normally open contact 121 is connected between the cathode 75 of the output tube 71 and the conductor L2 which is the same as the intermediate tap 107.

The anode 73 of the input tube 71 is connected to the tap 107 of the D. C. supply 65 through conductor L2 and a network consisting of a capacitor 141 in parallel with a resistor 143. The cathode 75 is connected directly to the negative terminal 105 of the D. C. supply. The anode potential for the input tube 71 is thus derived from the bank 101 of the D. C. supply. The anode 73 is also connected to the conductor L1. This connection includes a pair of resistors 145 and 147, which form a voltage divider across the conductors L1 and L2 and across resistor 147 of which a capacitor 149 and a resistor 151 are connected in series, and an integrating network consisting of a capacitor 153 shunted by a resistor 155. The integrating network is connected directly to the anode 73 and to the junction of the capacitor 149 and the resistor 151. A saw tooth supply of low voltage is supplied in the anode circuit of the input tube through the components 145 through 155.

The anode 83 of the output tube 81 of the amplifier 61 is connected to the positive terminal 163 of the D. C. supply through the exciting coil 123 of the D. C. relay. Since the cathode is connected to the center tap 107 of the D. C. supply through the normally open contact 121 of the A. C. relay 67, the cathode circuit of the output tube 81 is open in the quiescent condition of the apparatus.

Potential for charging the timing capacitor is derived from the D. C. supply 61 through a circuit including a relatively low impedance voltage divider 161 shunted by a resistor 163. This circuit extends from the center tap 107 through the normally closed contact 113 of relay 67, the divider 161 and the resistor 163, another resistor 164, to the negative terminal 105. In the quiescent condition of the apparatus when the contact 113 is closed there is then a drop across the divider 161 and resistor 163 so that the right hand terminal of these components is positive and the left hand negative. The setting of the divider 161 determines to what potential the capacitor 63 is charged.

In the quiescent condition of the apparatus the timing capacitor 63 is supplied from the network 161—163 in a circuit extending from the adjustable contact 171 of the divider 161 through a portion 175 of a high impedance variable resistor 173, the timing capacitor 63, the grid 77 and cathode 75 of the input tube 71, the resistor 164, to the negative side of the divider 161. The rate of discharge of the timing capacitor 63 may be in part set by the variable resistor 175.

The grid 77 of the input tube 71 is connected to the cathode 75 through the capacitor 63, the portion 175 of the resistor 173, the portion 177 of the divider 161 and the resistor 164. The capacitor 63 is charged with its plate connected to the grid 77 negative and the other plate positive so that it impresses a negative bias on the input tube 71.

The grid 87 of the output tube 81 is connected to the junction of the anode 73 of the input tube 71 and the capacitor-resistor network 141—143. The capacitor-resistor network 141—143, since it is adapted to be connected to the cathode 85 through the contact 121, thus functions as a bias in the control circuit of the output tube 81. In addition, when tube 71 is conducting, the potential of its anode 73, and therefore of the grid 87, is near that of the negative terminal 105 of the D. C. supply and the output tube 81 is non-conducting, and when tube 71 is non-conducting the potential of the grid 87 is nearer that of the tap 107 and the tube 81 is conducting. The heater filaments of both tubes are supplied through a suitable heater transformer HT from the supply conductors L1, L2.

The photocell 55 has an anode 181 and a cathode 183. The anode 181 is connected to the tap 107 of the D. C. supply (through conductor L2) and the cathode to the negative plate of the timing capacitor 63. The cell 55 can thus discharge the capacitor 63 in a circuit including the half 101 of the D. C. supply, the resistor 164, the divider portion 177 and the divider portion 173. The cell 55 is shunted by a high resistor 191 and the normally closed contact 125 of the D. C. relay.

Figure 11:
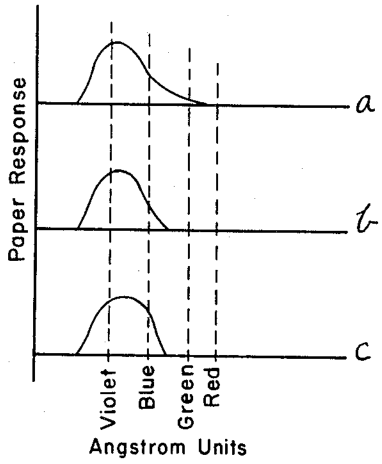

The paper 31 used in the practice of my invention is of the usual commercial type available and has a response characteristic to radiation as shown in Fig. 11. The three curves *a*, *b*, *c* in this view show the response of the paper as a function of the color of the light impressed. In each figure the response is plotted vertically in arbitrary units and the spectrum of the light horizontally. It is seen that in each case the paper is predominantly responsive to color between the blue and the ultra-violet; the response to the red is substantially zero and the response to the green is small. It is seen that to expose effectively the paper or the reproducing medium, light rich in the blue is essential. To subject the paper to light rich in the red is to expose it ineffectively.

Figure 9:
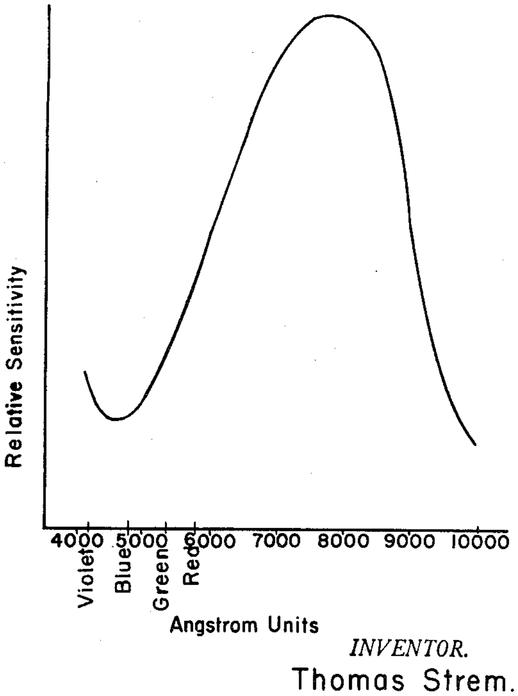
Fig. 9 is a graph showing the response of a photoelectric cell of one type used in the practice of my invention.
Figure 10:
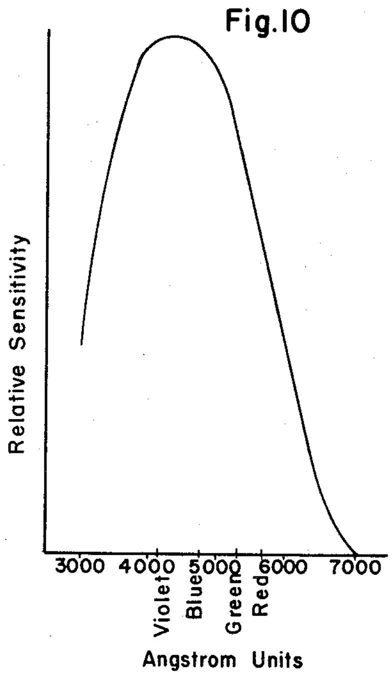
Fig. 10 is a graph showing the response of a photoelectric cell of another type used in the practice of my invention.

The response of photoelectric devices of two of the types used in the practice of my invention is shown in Figs. 9 and 10. In each case response is plotted vertically and wavelengths of light horizontally. To facilitate comparing the response with radiation, the color is also indicated along the abscissa. In Fig. 9, the response of a so-called red sensitive cell which is sold under the identification 919 is shown. This cell has a high response in the infra-red but in addition has substantial response in the blue and between the blue and infra-red. Fig. 10 is the response curve for a so-called blue-responsive cell sold under the identification 441. In this case, the cell has its maximum response in the violet or the near ultra-violet, has high response in the blue, and some response in the green and red, and falls off in response in the infra-red. Cells of either of the types represented may be used in the practice of my invention, but on the whole, the blue responsive cell is to be preferred.

In accordance with my invention, the spectral distribution of the radiation emitted by the source 23 is coordinated with the response of the reproducing medium 31 and of the cell 55 in such manner that the medium is effectively exposed during the time during which it is subjected to the light. This object is accomplished by providing a source which is capable of producing substantial radiation in the blue region of the spectrum. In accordance with my invention, I have found that such a source may be an ordinary tungsten lamp operated at a substantially higher than rated voltage. By operating the lamp at a higher voltage, its color temperature rating, that is, its actinic quality, is increased. In the practice of my invention, I have found that the color temperature should be of the order of at least 3200° Kelvin for prints suitable for amateur service and at least 3400 or 3500° Kelvin for prints suitable for the commercial art. The color temperature rating may also be increased by interposing a filter between a source and the negative. Where such a filter is the envelope of the lamp as in the case of a so-called daylight lamp, it is highly effective in reducing the temperature at which the filament must be operated to produce satisfactory prints. But a filter interposed between a lamp with a white envelope has a tendency to cut down the lumen output of the source to too low a magnitude.

The amplifier 61 used in the practice of my invention may take many forms. But a typical amplifier which I have found to operate satisfactorily is that shown in Fig. 6 which corresponds to that shown in Fig. 5 except that the magnitudes of the components and the types of tubes are shown. With respect to this amplifier I have found that reasonably satisfactory operation can be achieved without the network 145 through 155. If desirable to save cost these may be omitted.

Apparatus in accordance with my invention also includes a continuous developing chain through which the exposed paper may be passed continuously from a feed roll 201 to a power driven take-up reel 203. The chain includes a developing tank 205, a hypo tank 207, a fixing tank 209 and a washing tank 211. In addition, other tanks such as a short-stop tank may be included.

STANDBY

In the standby condition of the apparatus in accordance with my invention, the reproducing paper 31 is threaded into the feeding system 35—37 and is set in the gate 33 so that it can be properly exposed. The source 23—25 is connected as disclosed and the circuit breaker or other switching mechanism (not shown) for the apparatus is closed. Under these circumstances, the heaters 221, 225, 222 and 112 of the tubes 71, 81, 91, 93, and 109 are heated, the D. C. source 65 is energized through the rectifiers 91 and 93 and the timing capacitor 63 is charged so that the apparatus is set for operation. The timing capacitor 63 is charged so that the conductivity of the input tube 71 is low and its anode 73 is at a high positive potential. The control potential of the output tube 81 is thus also high but the latter is incapable of conducting because its cathode return lead is open at the normally opened contact 121 of the A. C. relay. The source 23 also is energized and energizes the cell 55. But the charge in the capacitor 63 is maintained by the charging circuit 161—163 and the apparatus does not time out.

TRIAL OPERATION

Before an actual printing operation is carried out, for a set of negatives, a trial operation is run. In this case, a negative known to be normal is printed in the system. The negative is inserted in the platen 21 and the light 23—25 is set at the desired actinic value. The time for the negative is adjusted by setting the variable resistor 175 to what appears to be a proper time for the negative. Then the pushbutton 129 is closed.

On the closing of the pushbutton, the exciting coil of the A. C. relay 67 is energized and its normally open contacts 117, 119 and 121 close and its normally closed contact 113 opens. At now-closed contact 117 of the relay 67, the grid circuit for the thyratron 109 is closed and the solenoid 108 is supplied with current. The shutter 45 is now actuated exposing the paper 31 in the gate 33. At the now closed contact 121 of the A. C. relay 67 the cathode return through the output tube 81 of the amplifier is closed. At this time the timing capacitor is fully charged so that the conductivity of the input tube 71 is low and the output tube 81 conducts energizing the D. C. relay 69. At the upper now closed contact 127 of the D. C. relay, the A. C. relay is locked in. At the other now open contact 125 of the D. C. relay, the shunt across the cell 55 is opened and the cell 55 is connected to time the discharge of the capacitor 63. The capacitor discharges at a rate dependent on the light impinging on the cell 55. At the same time the negative is reproduced on the positive 31. The potential of the capacitor 63 decreases as it discharges through the cell, and at the same time the conductivity of the input tube 71 of the amplifier increases correspondingly, decreasing the conductivity of the output tube 81. Eventually, the conductivity of the output tube 81 reaches so low a magnitude that the D. C. relay drops out, opening its normally open contact 127 and closing its normally closed contact 125.

Since at this time the pushbutton 129 has been released, the opening of the normally-open contact of the D. C. relay 69 causes the A. C. relay 67 to become deenergized and to drop out. The supply of power to the solenoid 108 is thus interrupted and the shutter 45 reverted to its blocking position. When the shutter is reverted to its blocking position, it closes the micro-switch 47, energizing the clutch 41 to actuate the take-up reel 37 to advance the sensitive medium 31 one step. A sample exposure of the trial negative has now been completed. This sample is torn out and treated by hand in the developing system shown in Fig. 7. It is then viewed and a determination made as to whether or not the time setting is proper. If the time setting is not proper, the above described process is repeated with a different time setting and another sample print produced. I have found that after producing one or two samples, the proper time setting is achieved. Naturally, in setting the time it is desirable to treat the sample exposure in the developing system in the same manner as the final exposures are to be printed.

OPERATION

After the proper time for a normal print has been determined, the apparatus is ready to operate. The different prints to be produced are then inserted one after the other in the negative holder 21 and on each insertion the pushbutton 129 is closed and the process described in the above section repeated. If it is desirable to make more than one print of each negative, it is only necessary that the apparatus be operated a repeated number of times with that negative in the holder 21 to produce the desired number of prints.

Figure 7:
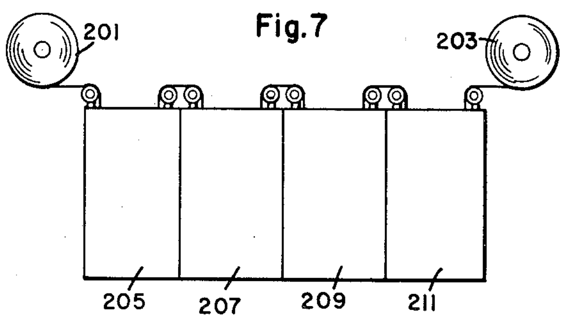
Fig. 7 is a diagrammatic view showing a developing chain used in the practice of my invention.

After a roll of paper 31 has been exposed, as just described, the roll is inserted in the developing train shown in Fig. 7 and is passed through the train. When it has been passed through and dried, the various prints on the roll are entirely satisfactory.

DEPENDENCE OF OPERATION ON ACTINIC VALUE OF SOURCE

The prints shown in Figs. 2A through 4D are prints produced with the negatives shown in Figs. 1A through 1D in the practice of my invention. However, to illustrate the important features of my invention, the actinic value of the light of the source 23 was set differently for each of the group of figures. In producing Figs. 2A through 4D, the source 23 was a General Electric PH-B-4 daylight lamp, the paper 31 was Medalist Y-2 of Eastman Kodak Company and the photocell 55 was of the 441 type. The lamp was operated at 75 volts for Figs. 2A through 2D. As can be seen from the latter figures, the prints produced are entirely unsatisfactory. Figs. 3A through 3D show a set of prints produced under the same conditions as for Figs. 2A through 2D except that the lamp was energized at a potential of 90 volts. These prints as has been explained are satisfactory for the amateur field but not for the commercial field. To achieve the quality desired in the commercial field, the source potential was raised to 115 volts and the prints shown in Figs. 4A through 4D are produced. These prints are of the high quality acceptable in the commercial field.

In addition to the prints illustrated in Figs. 2A through 4D, large numbers of prints were made with the negative shown in Figs. 1A through 1D. The results of these tests are shown in Chart I which is presented below.

*Chart I*

| Lamp Type | Lamp Voltage | Photo-cell Type | Result | Actinic Factor, °K. |
|---|---|---|---|---|
| 115-volt, 150-watt, inside frosted. | 120 | 441 | Poor | |
| Do | 130 | 441 | do | |
| Do | 145 | 441 | Acceptable, Amateur. | 3140 |
| Do | 155 | 441 | do | |
| Do | 165 | 441 | Acceptable, Commercial. | 3380 |
| PH 355—120-volt, 400-watt. | 115 | 441 | Poor | |
| Do | 125 | 441 | do | |
| Do | 135 | 441 | Acceptable, Amateur. | |
| Do | 145 | 441 | do | |
| Do | 165 | 441 | Acceptable, Commercial. | 3470 |
| Do | 115 | 919 | Poor | |
| Do | 125 | 919 | do | |
| Do | 135 | 919 | do | |
| Do | 145 | 919 | do | |
| Do | 165 | 919 | Acceptable, Commercial. | |

*Chart I*—Continued

| Lamp Type | Lamp Voltage | Photo-cell Type | Result | Actinic Factor, °K. |
|---|---|---|---|---|
| PH 304—115-125 volt, 500 watts. | 115 | 441 | Poor | |
| Do | 120 | 441 | do | |
| Do | 128 | 441 | Acceptable, Amateur. | |
| Do | 140 | 441 | do | |
| Do | 150 | 441 | Acceptable, Commercial. | 3440 |
| Do | 167 | 441 | do | |
| Do | 115-138 | 919 | Poor | |
| Do | 150 | 919 | Acceptable, Amateur. | |
| Do | 168 | 919 | Acceptable, Commercial. | |
| PH-B-2 Daylight—105-120 volt, 500 watt. | 90 | 441 | Poor | |
| Do | 95 | 441 | Acceptable, Amateur. | |
| Do | 100 | 441 | do | |
| Do | 108 | 441 | Acceptable, Commercial. | |
| Do | 113 | 441 | do | 3400 |
| Do | 120 | 441 | do | |
| PH-B-4 Daylight—115-120 volt, 1,000 watt. | 80-90 | 441 | Acceptable, Amateur. | |
| Do | 95-115 | 441 | Acceptable, Commercial. | 4300 |
| PH-4 White Frosted—115-120 volt, 1,000 watt. | 95 | 441 | Acceptable, Amateur. | |
| Do | 107 | 441 | do | |
| Do | 113 | 441 | Acceptable, Commercial. | |
| Do | 115 | 441 | do | |

Each row of Chart I corresponds to at least one set of prints made with the negatives shown in Figs. 1A through 1D. The paper 31 used in making the prints was in each case Medalist Y-2 of Eastman Kodak Company.

In the first column of Chart I the identification of the sources 23 is given. The sources 23 were all General Electric tungsten lamps and the identifications are those of General Electric. As can be seen various lamps having standard voltages of the order of 115 through 120 and power consumption from 150 watts through 1000 watts were used. In the second column the actual potentials at which the lamps were operated are given. In the third column the cells 55 for each set of prints are given. The 441 cell was bought from General Electric and the 919 from Radio Corporation of America. In the fourth column the results are given. To produce this column the various prints produced with the negatives shown in Figs. 1A through 1D were evaluated. As can be seen from the column, the prints were evaluated as poor, acceptable for amateur use or acceptable for commercial use. The prints produced with the lamps operated at low voltage were found to be poor; those at intermediate voltages, acceptable for amateur use and those at higher voltages, acceptable for commercial use. In the fifth column, the actinic value or color value of the printing light for the acceptable prints in degrees Kelvin is given. The actinic value K for a lamp of a given filament operating at a given voltage $V_g$ in a given envelope may be derived from the known actinic value K at another voltage V by means of the relationship $$\frac{V}{V_g}=\left(\frac{K}{K_g}\right)^{2.7}$$

or $$K_g=\frac{\sqrt[2.7]{\frac{V_g}{V}}}{K}$$

The charts show that for commercially acceptable prints the actinic value of the source should be at least 3400° K. and for amateur acceptable prints the actinic value should be about 3200° K. It is also indicated that it is desirable that the sources be operated at as high a voltage as practicable. The voltage, however, must be limited for economy reasons since the life of a lamp decreases sharply with increasing operating voltage. For this reason, lamps, like the daylight lamp, having envelopes of a high actinic value are particularly suitable for the practice of my invention since they permit operation at lower voltages.

Figs. 12 and 13 show systems in which the sources are turned on and off in the practice of my invention. In each case, a time delay is introduced sufficient to enable the source to reach full emissivity before the shutter is actuated.

The system shown in Fig. 12 includes an armature 241 for actuating the shutter 45 which has a time delay mechanism 243 connected thereto. The mechanism 243 delays the opening of the shutter by a time interval sufficient to permit the source to reach full emissivity but does not delay the return of the shutter to the closed position. A similar object may be accomplished by including in the grid circuit or the anode circuit of the thyratron 109 a network for delaying the firing of the thyratron for the requisite time.

The apparatus shown in Fig. 12 also includes a relay 267 which has normally open contacts 269, 271, 273 and 275 and normally closed contact 277 and the pushbutton 129. The contacts 269, 271, 273 and 277 and the button 129 perform the same function as the contacts 121, 119, 117 and 113, respectively, and 129 in the apparatus shown in Fig. 5. The contact 275 closes the circuit through source 23 immediately on the actuation of the relay 267. The source 23 then starts heating up as soon as relay 267 is actuated. In the meantime, the solenoid 281 is energized but its operation is delayed by mechanism 243 until after the source 23 has reached full emissivity.

In the apparatus shown in Fig. 13 the time delay relay 287 which is slow make and quick break is actuable by an auxiliary relay 289. The relay 287 has normally open contacts 291, 293, 295 and 297 and normally closed contact 299. The contacts 291, 293, 297 and 299 perform the same function as the contacts 121, 119, 117 and 113, respectively, of Fig. 5. The contact 295 serves to lock-in the coil 301 of the relay 289.

The relay 289 has normally open contacts 303, 305, 307. This relay may be energized by closing button 129. Contact 303 serves to actuate relay 287 which is then locked in through contact 127 and contact 293. Contact 305 serves to lock in relay 289 through contact 295. Contact 307 closes the circuit through the source 23 immediately on energization of relay 289.

Thus when switch 129 is closed relay 289 is actuable starting the heating of the source 23. After the source has been heated, relay 287 operates to start the timing.

I have disclosed herein automatic printing or enlarging apparatus with which negatives which may vary in density over a very high range may be reproduced and quality prints obtained. This objective is accomplished by matching the actinic value of the source with the spectral distributions of the photocell and the paper.

While I have shown and described a certain specific embodiment of my invention, many modifications thereof are possible. Thus, my invention has been shown as applied to a projection printer. It is also applicable to a contact printer. My invention, in its broader aspects, is further applicable to printing color prints. Specifically, the time delay disclosed in Figs. 12 and 13 may also be obtained in other ways. For example the cathode heater 223 output tube 87 of the amplifier may be used to introduce the time delay. To accomplish this object the A. C. relay 67 is provided with normally open contacts which close the heating circuit for source 25 and additional small open contacts which close the heater unit for tube 81 when the relay 67 is actuated. Since the heater 223 must reach a high temperature before tube 81 operates there is a delay before the timing starts after the power is supplied to filament 25. My invention, therefore, is not to be limited except insofar as is necessitated by the spirit of the prior art.

I claim as my invention:

1. Photographic apparatus for reproducing a negative comprising a source including an incandescible filament for projecting light on said negative, a circuit, open in the quiescent condition of said apparatus, for heating said filament, a photographically sensitive medium disposed to receive on its sensitive surface the resulting light from said negative, photosensitive means responsive to the resulting light from said negative for timing the impressing of said last-named light on said medium, means for blocking the transmission of light from said negative to said medium, said blocking means being actuable to permit transmission of light to said medium, means connected to said circuit and actuable to close said circuit, and means responsive to said connected means, for actuating said blocking means to permit transmission of light from said negative to said medium a predetermined time interval after the closing of said circuit sufficient to enable said filament to reach its full emissivity.

2. Photographic enlarging or printing apparatus for automatically producing prints in a reproducing medium, from negatives of widely varying densities including a source of light, means for projecting light from said source on said negative, means for exposing said medium to the resulting light from said negative, a photo-sensitive device, means for projecting the resulting light from said negative on said device, and means responsive to said device when exposed to said resulting light for timing the exposure of said medium; the said apparatus being characterized by a source of light having a spectral distribution so related to the response of said device and the spectral sensitivity of said medium that said medium is effectively exposed during substantially the whole timing operation of said means responsive to said device, the said cource of light including an incandescible filament, and the said apparatus being further characterized by a normally open circuit for energizing said filament, by means for blocking the transmission of the resulting light from the negative to the medium, said blocking means being actuable to permit the resulting light to be transmitted to said medium, and by means connected to said circuit and to the timing means for closing said circuit and, after a predetermined time interval sufficient to enable said filament to reach its full emissivity, for actuating said blocking means to permit transmission of light from said negative to said medium.

3. Photographic apparatus for reproducing a negative comprising a source including an incandescent filament for projecting light on said negative, a circuit, open in the quiescet condition of said apparatus, for heating said filament, a photographically sensitive medium disposed to receive on its sensitive surface the resulting light from said negative, photosensitive means responsive to the resulting light from said negative for timing the impressing of said last-named light on said medium, means for blocking the transmission of light from said negative to said medium, said blocking means being actuable to permit transmission of light to said medium, switch means actuable to close said circuit, means for actuating said switch means, and means, responsive to an operation of said actuating means, for actuating said blocking means to permit transmission of light from said negative to said medium a predetermined time interval after the closing of said circuit sufficient to enable said filament to reach its full emissivity.

4. Photographic apparatus for reproducing a negative comprising a source including an incandescible filament for projecting light on said negative, a circuit, open in the quiescent condition of said apparatus, for heating said filament, a photographically sensitive medium disposed to receive on its sensitive surface the resulting light from said negative, photosensitive means responsive to the resulting light from said negative for timing the impressing as aforesaid of said resulting light on said medium, means for initiating a timing operation of said photosensitive means, means for blocking the transmission of light from said negative to said medium, said blocking means being actuable to permit transmission of light from said negative to said medium, means connected to said circuit and actuable to close said circuit, and means responsive to said connected means for actuating said blocking means to permit transmission of light from said negative to said medium and substantially simultaneously to actuate said initiating means to initiate a timing operation as aforesaid, said blocking means and sad timing means beng actuated a predetermined time interval after the closing of said circuit which interval is sufficient to enable said filament to reach its full emissivity.

References Cited in the file of this patent

UNITED STATES PATENTS

| | | |
|---|---|---|
| 2,038,430 | Jameson | Apr. 21, 1936 |
| 2,435,099 | Pratt | Jan. 27, 1948 |
| 2,481,694 | Schubert | Sept. 13, 1949 |
| 2,501,365 | Varden | Mar. 21, 1950 |
| 2,566,264 | Tuttle | Aug. 28, 1951 |
| 2,566,277 | Williams | Aug. 28, 1951 |
| 2,571,697 | Evans | Oct. 16, 1951 |